(12) United States Patent
Chen et al.

(10) Patent No.: US 9,794,739 B2
(45) Date of Patent: Oct. 17, 2017

(54) ASSISTANT WIRELESS UE POSITIONING METHOD AND DEVICE

(71) Applicant: ZTE CORPORATION, Shenzhen, Guangdong Province (CN)

(72) Inventors: Shijun Chen, Shenzhen (CN); Liujun Hu, Shenzhen (CN); Guanghui Yu, Shenzhen (CN); Lin Chen, Shenzhen (CN)

(73) Assignee: XI'AN ZHONGXING NEW SOFTWARE CO. LTD, Xi'an (CN)

( * ) Notice: Subject to any disclaimer, the term of this patent is extended or adjusted under 35 U.S.C. 154(b) by 0 days.

(21) Appl. No.: 15/023,623

(22) PCT Filed: May 21, 2014

(86) PCT No.: PCT/CN2014/078054
§ 371 (c)(1),
(2) Date: Mar. 21, 2016

(87) PCT Pub. No.: WO2015/043206
PCT Pub. Date: Apr. 2, 2015

(65) Prior Publication Data
US 2016/0205504 A1   Jul. 14, 2016

(30) Foreign Application Priority Data
Sep. 26, 2013 (CN) .......................... 2013 1 0445134

(51) Int. Cl.
*H04W 4/02* (2009.01)
*H04W 64/00* (2009.01)
*G01S 19/05* (2010.01)

(52) U.S. Cl.
CPC .............. *H04W 4/02* (2013.01); *G01S 19/05* (2013.01); *H04W 64/00* (2013.01)

(58) Field of Classification Search
CPC ... G01S 19/05; G01S 5/08; G01S 5/30; G01S 19/25; G01S 19/06; G01S 5/0231;
(Continued)

(56) References Cited

U.S. PATENT DOCUMENTS

| 8,370,629 B1 | 2/2013 | Ngo et al. |
| 2006/0267841 A1* | 11/2006 | Lee ...................... G01S 5/0081 342/463 |

(Continued)

FOREIGN PATENT DOCUMENTS

| CN | 101023632 A | 8/2007 |
| CN | 101112112 A | 1/2008 |

(Continued)

OTHER PUBLICATIONS

International Search Report (Form PCT/ISA/210) for International Application No. PCT/CN2014/078054 mailed Sep. 1, 2014.
Extended European Search Report from corresponding European Patent Appl. No. 14847447.1, dated Sep. 1, 2016.

*Primary Examiner* — Meless Zewdu
(74) *Attorney, Agent, or Firm* — Koppel, Patrick, Heybl & Philpott (57) ABSTRACT

An assistant wireless UE positioning method and device is provided, and relates to the field of wireless communication. The device includes: a request sending component configured to, when first UE to which it belongs does not have a positioning capability, initiate an assistant positioning request to at least one piece of second UE which has finished positioning near the first UE, and store sending time of the assistant positioning request; a response receiving component, configured to receive assistant positioning information in response to the assistant positioning request by the second UE, and store receiving time of the assistant positioning information; and a positioning calculation component configured to determine a spatial position by virtue of the (Continued)

assistant positioning information, the receiving information and the sending time of the assistant positioning request.

9 Claims, 4 Drawing Sheets

(58) Field of Classification Search
CPC .... G01S 5/0236; G01S 5/0242; G01S 5/0289; G01S 5/00; G01S 5/04; G01S 7/4865; G01S 19/10; H04W 4/02; H04W 64/00; H04W 4/023; H04W 4/025; H04W 4/028; H04W 56/0065; H04W 56/006; H04W 56/008; H04W 64/003; H04W 64/006; H04L 9/0872; H04L 29/08657
See application file for complete search history.

(56) References Cited

U.S. PATENT DOCUMENTS

| | | | | |
|---|---|---|---|---|
| 2007/0024498 | A1* | 2/2007 | Korneluk | G01S 19/05 342/357.42 |
| 2010/0309057 | A1* | 12/2010 | Edge | G01S 5/0236 342/451 |
| 2013/0029685 | A1 | 1/2013 | Moshfeghi | |
| 2014/0179339 | A1* | 6/2014 | Hofleitner | H04W 4/02 455/456.1 |

FOREIGN PATENT DOCUMENTS

| | | |
|---|---|---|
| CN | 101873692 A | 10/2010 |
| CN | 101917667 A | 12/2010 |
| WO | WO 2010030403 A1 | 3/2010 |

* cited by examiner

ASSISTANT WIRELESS UE POSITIONING METHOD AND DEVICE

TECHNICAL FIELD

The present disclosure relates to the field of wireless communication, and in particular to a wireless communication positioning technology.

BACKGROUND

With the development of the times, a mobile phone positioning technology has drawn more and more attentions. Both a Global Positioning System (GPS) positioning technology and positioning with a wireless sensor network or another positioning means have limits. In order to achieve higher positioning accuracy, combination of multiple positioning systems for cooperative positioning, i.e. multimode positioning is a direction for future development, and respective advantages may be utilized to achieve higher accuracy and response speed and also cover a wider range to implement seamless and accurate positioning. For example, a satellite positioning system and a mobile communication system are organically combined for mobile phone positioning, and advantages of large coverage area and high open space positioning accuracy of the satellite positioning system and high indoor and dense urban area positioning accuracy of a mobile communication network are fully utilized, so that a market requirement is better met.

Figure 1:
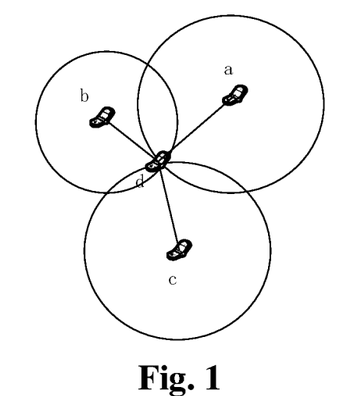
FIG. 1 is a diagram of spherical intersection positioning according to the conventional art.
Figure 2:
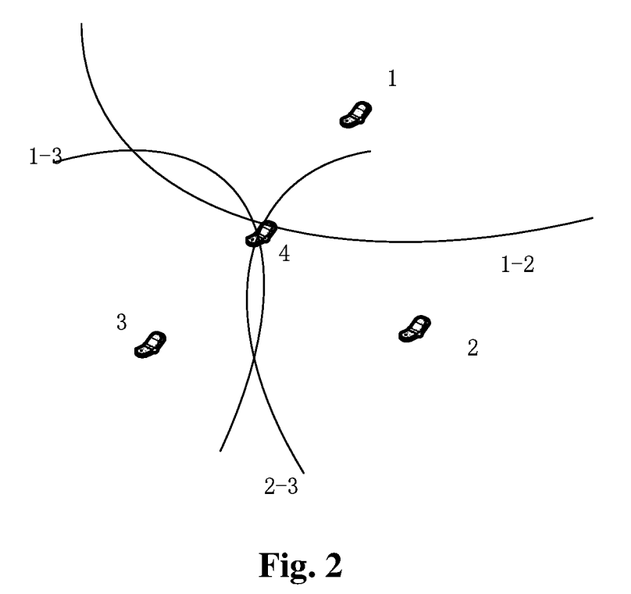
FIG. 2 is a diagram of hyperbolic intersection positioning according to the conventional art.

For satellite positioning, at least four satellites are required to be found, distance measurement is performed according to time of arrival, then at least four spherical equations or hyperbolic equations are listed according to a distance measurement result, as shown in FIG. 1 and FIG. 2, and the equations are solved to obtain a spatial position. In a room or a dense urban area, a GPS signal is highly attenuated, so that four satellites may not be completely found, GPS positioning may not be implemented, and a positioning function is restricted.

A conventional wireless positioning solution has a main problem of narrow selection range of positioning anchor points only limited to public anchor points such as satellite base stations. In addition, the problem of cellular positioning accuracy may also be caused by factors of Non Line Of Sight (NLOS), multiple paths, channel environment changes and the like in a room, and about this, some research results have been obtained, all usually on the basis of ideal assumptions, in the industry, and a technical solution feasible during a practical application is required to be further deeply researched.

SUMMARY

The embodiment of the present disclosure is intended to provide an assistant wireless UE positioning method and device, which may better solve a problem about wireless positioning of UE.

According to one aspect of the embodiment of the present disclosure, an assistant wireless UE positioning method is provided, which may include that:

first UE without a positioning capability initiates an assistant positioning request to at least one piece of second UE which has finished positioning nearby, and stores sending time of the assistant positioning request;

the first UE receives assistant positioning information, sent by the second UE, in response to the assistant positioning request, and stores receiving time of the assistant positioning information; and the first UE determines its spatial position by virtue of the received assistant positioning information, the receiving time of the assistant positioning and the sending time of the assistant positioning request.

Preferably, before the first UE without the positioning capability initiates the assistant positioning request to the at least one second UE which has finished positioning nearby, the method may further include a step that whether the first UE has the positioning capability or not is judged, the step including that:

the first UE compares the amount of its known positioning information with a first preset threshold; and if the amount is smaller than the first preset threshold, it is determined that the first UE does not have the positioning capability, otherwise it is determined that the first UE has the positioning capability, wherein a source of the known positioning information may include a satellite and/or a wireless base station and/or a Wireless Fidelity (WIFI) node.

Preferably, the second UE which has finished positioning may receive the assistant positioning request and compare signal strength of the assistant positioning request with a second preset threshold, and if the signal strength is higher than the second preset threshold, the second UE may send the assistant positioning information in response to the assistant positioning request to the first UE.

Preferably, the assistant positioning information may include a spatial position of the second UE and a time difference between the sending time of the assistant positioning information and the receiving time of the assistant positioning request.

Preferably, the step that the first UE determines its spatial position by virtue of the assistant positioning information, the receiving time and the sending time of the assistant positioning request may include that:

the first UE determines a distance with the second UE by virtue of the receiving time of the assistant positioning information, the sending time of the assistant positioning request and the time difference between the sending time of the assistant positioning information and the receiving time of the assistant positioning request; and the spatial position is determined by virtue of the distance and the spatial position of the second UE.

Preferably, if the sum of the amounts of the known positioning information of the first UE and the received assistant positioning information is smaller than the first preset threshold, the signal strength of the assistant positioning request may be increased to increase the amount of the assistant positioning information responsive to the assistant positioning request until the sum of the amounts is more than or equal to the first preset threshold, thereby endowing the first UE with the positioning capability.

According to another aspect of the embodiment of the present disclosure, an assistant wireless UE positioning device is provided, which may include:

a request sending component configured to, when first UE to which it belongs does not have a positioning capability, initiate an assistant positioning request to at least one piece of second UE which has finished positioning near the first UE, and store sending time of the assistant positioning request;

a response receiving component configured to receive assistant positioning information, sent by the second UE, in response to the assistant positioning request, and store receiving time of the assistant positioning information; and a positioning calculation component configured to determine a spatial position by virtue of the assistant positioning information, the receiving information of the assistant positioning information and the sending time of the assistant positioning request.

Preferably, the device may further include:

a capability determination component configured to compare the amount of known positioning information of the first UE with a first preset threshold, determine that the first UE does not have the positioning capability if the amount is smaller than the first preset threshold, otherwise determine that the first UE has the positioning capability, wherein a source of the known positioning information may include a satellite and/or a wireless base station and/or a WIFI node.

Preferably, the assistant positioning information may include a spatial position of the second UE and a time difference between the sending time of the assistant positioning information and the receiving time of the assistant positioning request, and the positioning calculation component may include:

a distance determination sub-component configured to determine a distance between the first UE and the second UE by virtue of the receiving time of the assistant positioning information, the sending time of the assistant positioning request and the time difference between the sending time of the assistant positioning information and the receiving time of the assistant positioning request; and a position determination sub-component configured to determine the spatial position of the first UE by virtue of the distance and the spatial position of the second UE.

According to another aspect of the embodiment of the present disclosure, an assistant wireless UE positioning device is provided, which may include:

a request receiving component configured to receive an assistant positioning request from first UE without a positioning capability;

a comparison component configured to compare signal strength of the assistant positioning request with a second preset threshold in second UE to which it belongs; and a response sending component configured to, when the signal strength is higher than the second preset threshold, send assistant positioning information in response to the assistant positioning request to the first UE for the first UE to implement assistant positioning.

Compared with the conventional art, the embodiment of the present disclosure has beneficial effects as follows:

according to the embodiment of the present disclosure, by cooperation between the UE, the UE which may not independently finish positioning according to the known positioning information of the satellite and/or the wireless base station and/or the WIFI node may utilize the UE which has successfully finished positioning to implement assistant wireless positioning.

DETAILED DESCRIPTION OF THE EMBODIMENTS

Preferred embodiments of the present disclosure will be described below with reference to the drawings in detail, and it should be understood that the preferred embodiments described below are only adopted to describe and explain the present disclosure and not intended to limit the present disclosure.

Figure 3:
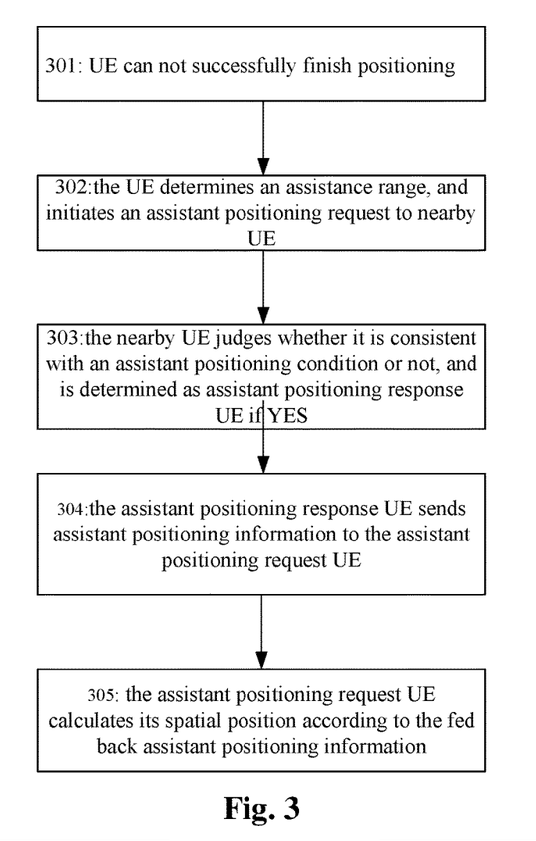
FIG. 3 is a flowchart of assistant wireless UE positioning according to an embodiment of the present disclosure.

FIG. 3 is a flowchart of assistant wireless UE positioning according to an embodiment of the present disclosure, and as shown in FIG. 3, the flow includes the following steps.

Step 301: first UE which may not successfully finish positioning is determined as assistant positioning.

The first UE judges whether its positioning condition is met or not. The first UE performs positioning if YES, and is determined as the assistant positioning request UE if NO. Specifically, the positioning condition specifically includes, but not limited to: whether sufficient signals are received from a satellite or not and whether sufficient signals are received from other positioning anchor points or not, the other positioning anchor points including, but not limited to, a wireless base station, an indoor WIFI node and the like. If the sum of the number of the signals from the satellite and the number of the signals from the other positioning anchor points is smaller than a first preset threshold (which is at least 4), the positioning condition is not met, and it is necessary to initiate an assistant positioning request. An assistance number is obtained by subtracting the sum of the number of the signals of the satellite and the number of the signals of the other positioning anchor points from the first preset threshold, that is, assistance responses of nearby UE in a number which is at least equal to the assistance number, i.e. assistant positioning information in an amount which is at least equal to the assistance number, are required to be received.

The embodiment is described with the condition that the first UE does not meet the positioning condition, that is, the first UE does not have a positioning capability, as an example.

Step 302: the assistant positioning request UE determines an assistance range, and initiates the assistant positioning request to nearby UE.

The assistant positioning request UE may several set signal strength levels for the assistant positioning request in advance, different signal strength levels correspond to different sizes of the assistance range. If signal strength is higher, the assistance range is larger. When sending the assistant positioning request for the first time, the assistant positioning request UE sets the signal strength into the lowest level, initiates the assistant positioning request to the nearby UE and records sending time T0.

Step 303: the nearby UE receives the assistant positioning request, records time of arrival T1 of the assistant positioning request, simultaneously judges whether the nearby UE meets an assistant positioning condition or not. The nearby UE is determined as assistant positioning response UE if the nearby UE meets the assistant positioning condition, and the assistant positioning response UE calculates sending time T2 of a request response signal, and sends its own spatial position and delta (delta=T2−T1) to the assistant positioning request UE.

The step that the nearby UE judges whether it meets the assistant positioning condition or not includes, but not limited to, that: whether the UE has finished positioning or not is judged; whether the signal strength of the received assistant positioning request is higher than a second preset threshold or not is judged; and if the two conditions are met, the UE responds to the assistant positioning request. That is, if the assistant positioning response UE has not finished positioning or the signal strength is lower than the second preset threshold, the UE does not respond to the assistant positioning request. If the assistant positioning response UE meets the assistant positioning condition and may provide assistant positioning information, its own spatial position and a difference between the sending time of the auxiliary positioning information and the receiving time of the assistant positioning request are sent to the assistant positioning request UE.

Step 304: the assistant positioning response UE sends the assistant positioning information to the assistant positioning request UE.

Step 305: the assistant positioning request UE calculates its spatial position according to the fed back assistant positioning information.

The assistant positioning request UE receives the requested assistant positioning information, records the receiving time T3, and calculates distance information, i.e. distance $d^i=c*(T3-T0-delta^i)$ according to time information, where c is the light speed, $d^i$ is a distance between the assistant positioning request UE and the ith assistant positioning response UE, i is the serial number of the assistant positioning response UE which responds to the assistant positioning request, and $delta^i$ is time correction of the ith assistant positioning response UE.

The assistant positioning request UE calculates its spatial position by comprehensively merging information of found known position points, including information of the satellite, information of the other anchor points and information of the assistant positioning response UE. The spatial position of the assistant positioning request UE is presumed to be (x, y, z), a combined equation set is given according to the position and distance information of all the known position points, and the equation set is solved to obtain a solution of (x, y, z).

If the number of the responses received by the assistant positioning request UE is more than or equal to the assistance number, the position of the UE is calculated, otherwise the signal strength level of the assistant positioning request is increased, and Step 302 to Step 305 are repeated. If the signal strength level has reached the highest signal level, it is prompted that the positioning condition is not met. In other words, if the sum of the amounts of the known positioning information of the assistant positioning request UE and the received assistant positioning information is smaller than the first preset threshold, the amount of the assistant positioning information responsive to the assistant positioning request is increased until the sum of the amounts is more than or equal to the first preset threshold, thereby endowing the assistant positioning request UE with the positioning capability.

In short, the first UE compares the amount of the known positioning information with the first preset threshold. The first UE is determined not to have the positioning capability when the amount is smaller than the first preset threshold, otherwise the first UE is determined to have the positioning capability, wherein a source of the known positioning information includes the satellite and/or the wireless base station and/or the WIFI node. In the embodiment, it is supposed that the first UE does not have the positioning capability, and it is determined as the assistant positioning request UE. The assistant positioning request UE initiates the assistant positioning request to at least one piece of assistant positioning response UE which has finished positioning nearby, and stores the sending time of the assistant positioning request. The assistant positioning response UE which has finished positioning receives the assistant positioning request and compares the signal strength of the request with the second preset threshold, and when the signal strength is higher than the second preset threshold, the assistant positioning response UE sends the assistant positioning information in response to the assistant positioning request to the assistant positioning request UE, wherein the assistant positioning information includes the spatial position of the assistant positioning response UE and the time difference between the sending time of the assistant positioning information and the receiving time of the assistant positioning request. The assistant positioning request UE receives the assistant positioning information, sent by the assistant positioning response UE, in response to the assistant positioning request, stores the receiving time of the assistant positioning information, determines the distance between the assistant positioning request UE and the assistant positioning response UE by virtue of the receiving time of the assistant positioning information, the sending time of the assistant positioning request and the time difference between the sending time of the assistant positioning information and the receiving time of the assistant positioning request, and determines its spatial position by virtue of the distance and the spatial position of the assistant positioning response UE.

Figure 4:
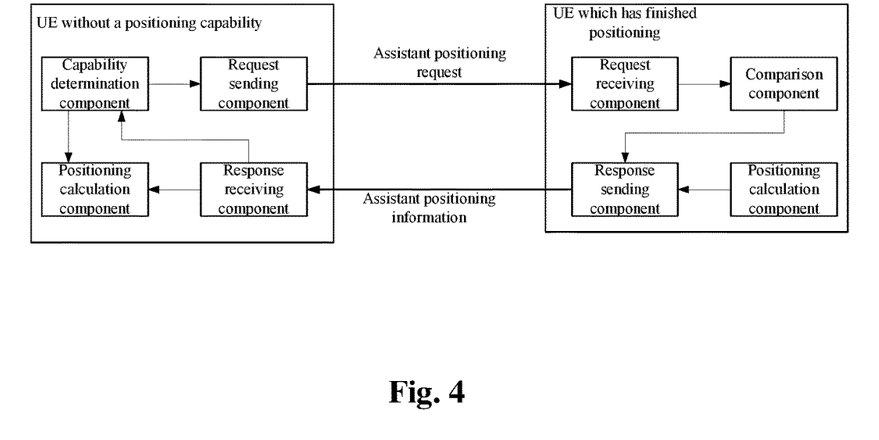
FIG. 4 is a structure diagram of an assistant wireless UE positioning device according to an embodiment of the present disclosure.

FIG. 4 is a structure diagram of an assistant wireless UE positioning device according to an embodiment of the present disclosure, and as shown in FIG. 4, the device includes: first UE without a positioning capability and second nearly UE which has finished positioning.

The first UE without the positioning capability includes a capability determination component, a request sending component, a response receiving component and a positioning calculation component, wherein the capability determination component is configured to compare the amount of known positioning information of the first UE with a first preset threshold, determine that the first UE does not have the positioning capability if the amount is smaller than the first preset threshold, otherwise determine that the first UE has the positioning capability, wherein a source of the known positioning information includes a satellite and/or a wireless base station and/or a WIFI node. Specifically, the capability determination component is configured to check the known positioning information of the first UE, wherein the step that the known positioning information of the first UE is checked includes, but not limited to, that: whether sufficient signals are received from the satellite or not is judged and whether sufficient signals are received from other positioning anchor points or not is judged, the other positioning anchor points including, but not limited to, the wireless base station, the indoor WIFI node and the like. If the sum of the number of the signals from the satellite and the number of the signals from the other positioning anchor points is smaller than the first preset threshold (which is at least 4), the first UE initiates an assistant positioning request. An assistance number is obtained by subtracting the sum of the number of the signals from the satellite and the number of the signals from the other positioning anchor points from the first preset threshold, and assistance responses in a number which is at least equal to the assistance number are required to be received.

The request sending component is configured to, when the first UE does not have the positioning capability, initiate the assistant positioning request to at least one piece of second UE which has finished positioning near the first UE, and store sending time of the assistant positioning request; and preferably, the request sending component is further configured to determine signal strength of the assistant positioning request to determine an assistance request range so as to send the assistant positioning request in the determined assistance request range. Several signal strength levels are preset. The signal strength is set into the lowest level when the assistant positioning request is sent for the first time. If the amount of received assistant positioning information is smaller than the assistance number, the signal strength level is increased, and the assistant positioning request is reinitiated by broadcasting. That is, implementation of assistant positioning of the first UE requires that the sum of the amounts of the known positioning information and the received assistant positioning information is more than or equal to the first preset threshold.

The response receiving component is configured to receive assistant positioning responses, and is specifically configured to receive the assistant positioning information, sent by the second UE, in response to the assistant positioning request, and store receiving time of the assistant positioning information, wherein the assistant positioning information includes a spatial position of the second UE and a time difference between the sending time of the assistant positioning information and the receiving time of the assistant positioning request.

The positioning calculation component is configured to determine a spatial position by virtue of the assistant positioning information, the receiving time and the sending time of the assistant positioning request, and specifically, the positioning calculation component includes: a distance determination sub-component and a position determination sub-component, wherein the distance determination sub-component determines a distance between the first UE and the second UE by virtue of the receiving time of the assistant positioning information, the sending time of the assistant positioning request and the time difference between the sending time of the assistant positioning information and the receiving time of the assistant positioning request, and then the position determination sub-component determines the spatial position of the first UE by virtue of the distance and the spatial position of the second UE. Specifically, the positioning calculation component calculates the spatial position of the first UE by comprehensively merging information of found known position points, including information of the satellite, information of the other anchor points and information of the second UE. The spatial position of the first UE is presumed to be (x, y, z), a combined equation set is given according to the position and distance information of all the known position points, and the equation set is solved to obtain a solution of (x, y, z).

Under the condition that the first UE may not finish positioning according to the currently known positioning information, the first UE cooperates with the nearby UE, initiates the assistant positioning request and receives the assistant positioning information in response to the assistant positioning request. By cooperation, after the capability determination component determines that the positioning information meets a positioning algorithm, the positioning calculation component performs positioning by virtue of the positioning information, wherein the inputs of the positioning calculation component includes, but not limited to, known positioning information of a public positioning facility and the assistant positioning information of the cooperative UE, and the output of the positioning calculation component includes, but not limited to, the spatial position of the first UE, i.e. coordinates of the first UE.

The second nearby UE which has finished positioning includes:

a request receiving component configured to receive the assistant positioning request from the first UE without the positioning capability;

a comparison component configured to compare the signal strength of the assistant positioning request with a second preset threshold of the second UE to which the comparison component belongs;

a response sending component configured to, when the signal strength is higher than the second preset threshold, send the assistant positioning information in response to the assistant positioning request to the first UE so that the first UE implements assistant positioning; and a positioning calculation component configured to, when the amount of known positioning information of the second UE to which the positioning calculation component belongs is more than or equal to the first preset threshold of the second UE, determine the spatial position of the second UE by virtue of the known positioning information, wherein a source of the known positioning information includes the public positioning facility such as the satellite and/or the wireless base station and/or the WIFI node.

The positioning calculation component of the second UE independently finishes positioning to determine the spatial position of the second UE, i.e. coordinates of the second UE, according to the conventional art by virtue of the public positioning facility such as the satellite. The second UE analyzes the assistant positioning request sent by the first UE without the positioning capability to judge whether to send the assistant positioning information to the first UE or not, and sends the assistant positioning information to the first UE if the second UE can assist the first UE to position.

After receiving the assistant positioning request, the second UE judges whether the second UE meets an assistant positioning condition or not. Specifically the assistant positioning condition includes, but not limited to, that: whether the second UE has finished positioning or not is judged; whether the signal strength of the received assistant positioning request is higher than the second preset threshold or not is judged; and only when the two conditions are met, the second UE responds to the assistant positioning request from the first UE. That is, if the second UE has not finished positioning or the signal strength is lower than the second preset threshold, the second UE does not respond to the assistant positioning request. If the second UE meets the assistant positioning condition and may provide the assistant positioning information, its own spatial position and the difference between the sending time of the auxiliary positioning information and the receiving time of the assistant positioning request are sent to the first UE.

The UE without the positioning capability includes UE which may not independently finish positioning according to the known positioning information of the public positioning facility, and also includes UE which may not finish positioning according to the known positioning information of the public positioning facility and the assistant positioning information of the other cooperative UE.

The UE which has finished positioning includes UE which may independently finish positioning according to the known positioning information of the public positioning facility, and also includes UE which may finish positioning according to the known positioning information of the public positioning facility and the assistant positioning information of the other cooperative UE.

Figure 5:
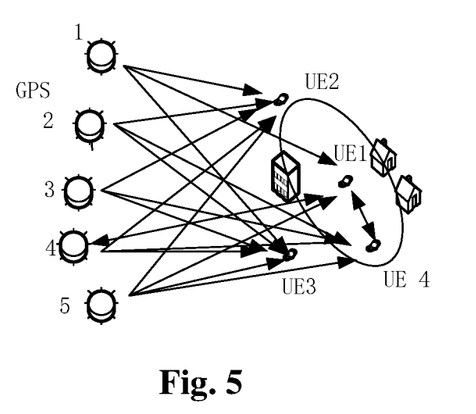
FIG. 5 is a scenario chart of assistant wireless UE positioning in a dense urban area according to an embodiment of the present disclosure.

FIG. 5 is a scenario chart of assistant wireless UE positioning in a dense urban area according to an embodiment of the present disclosure. As shown in FIG. 5, there are four pieces of UE in the dense urban area, and it supposed that there are five visible satellites in the sky.

According to a conditional satellite navigation positioning algorithm, signals from at least four satellites are required to be received for positioning. In the embodiment:

UE2 may receive signals from the five satellites GPS1, GPS2, GPS3, GPS4 and GPS5, and meets an independent positioning condition, so that UE2 may independently finish positioning; positioning information is presumed to be ($\alpha 2$, x2, y2, z2), wherein $\alpha 2$ is a time difference of a clock of UE2 and the satellites, and x2, y2 and z2 are three-dimensional coordinates of UE2 respectively;

UE3 may receive the signals from the five satellites GPS1, GPS2, GPS3, GPS4 and GPS5, and meets the independent positioning condition, so that UE3 may independently finish positioning; positioning information is presumed to be ($\alpha 3$, x3, y3, z3), wherein $\alpha 3$ is a time difference of a clock of UE3 and the satellites, and x3, y3 and z3 are three-dimensional coordinates of UE3 respectively;

UE4 may receive the signals from four satellites GPS2, GPS3, GPS4 and GPS5, and meets the independent positioning condition, so that UE4 may independently finish positioning; positioning information is presumed to be ($\alpha 4$, x4, y4, z4), wherein $\alpha 4$ is a time difference of a clock of UE4 and the satellites, and x4, y4 and z4 are three-dimensional coordinates of UE4 respectively;

UE1 may receive the signals from three satellites GPS1, GPS4 and GPS5, and does not meet the independent positioning condition, so that UE1 may not independently finish positioning, that is, current UE1 does not have a positioning capability; and positioning information is presumed to be ($\alpha$, x, y, z), wherein a is a time difference of a clock of UE1 and the satellites, and x, y and z are three-dimensional coordinates of UE1 respectively. An assistant positioning process of UE1 is implemented as follows according to the method of the embodiment of the present disclosure.

1: UE1 does not meet the independent positioning condition, so that UE1 is determined as assistant positioning request UE, the assistant positioning request UE sets signal strength of an assistant positioning request into the lowest level, and if received assistant positioning information is insufficient, the signal strength level of the assistant positioning request is increased.

2: UE1 initiates the assistant positioning request to UE around, and records sending time T0 of the assistant positioning request.

3: The UE around receives the assistant positioning request, records receiving time T1 of the assistant positioning request, simultaneously judges whether the UE around meets an assistant positioning condition or not, and is determined as assistant positioning response UE if the UE around meets the assistant positioning condition.

In the embodiment, UE2, UE3, UE4 and UE5 are UE around UE1. When the signal strength level of the request is regulated to a certain level, UE4 may meet the assistant positioning condition first, and is determined as the assistant positioning response UE.

4: UE4 records the receiving time T1 of the assistant positioning request, and time when assistant positioning information in response to the assistant positioning request is sent is presumed to be T2, and UE4 calculates delta4=T2−T1, and then sends the information including delta4 and (x4, y4, z4) to UE1.

5: UE1 receives the assistant positioning information, records receiving time T3 of the assistant positioning information, and calculates a distance d4=c*(T3−T0−delta4) between UE1 and UE4.

6: since UE1 may receive the signals from three satellites, the amount of required assistant positioning information is equal to 1, and only one piece of UE around is required to respond to enable UE1 to meet the positioning condition.

After UE1 receives the assistant positioning information sent by UE4, UE1 may establish an equation set including four equations by virtue of distance measurement information between UE1 and GPS1, GPS4 and GPS5 respectively, and distance measurement information (i.e. the assistant positioning information) between UE1 and UE4, and may obtain ($\alpha$, x, y, z) by solving the equation set.

Figure 6:
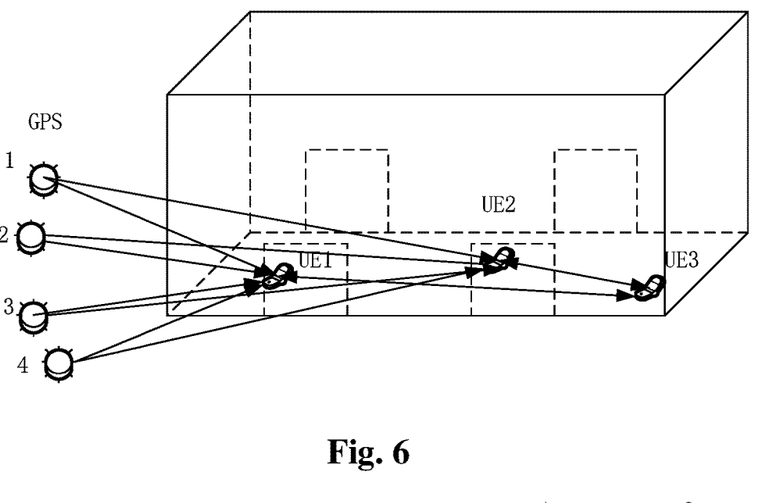
FIG. 6 is a scenario chart of indoor assistant wireless UE positioning according to an embodiment of the present disclosure.

FIG. 6 is a scenario chart of indoor assistant wireless UE positioning according to an embodiment of the present disclosure. As shown in FIG. 6, there are three pieces of UE in a room, and it is supposed that there are four visible satellites in the sky.

According to a conditional satellite navigation positioning algorithm, signals from at least four satellites are required to be received for positioning. In the embodiment:

UE1 may receive signals from totally four satellites GPS1, GPS2, GPS3 and GPS4, and meets an independent positioning condition, so that UE1 may independently finish positioning; positioning information is presumed to be ($\alpha 1$, x1, y1, z1), wherein $\alpha 1$ is a time difference between a clock of UE1 and the satellites, and x1, y1 and z1 are three-dimensional coordinates of UE1 respectively;

UE2 may receive the signals from totally four satellites GPS1, GPS2, GPS3 and GPS4, and meets the independent positioning condition, so that UE2 may independently finish positioning; positioning information is presumed to be ($\alpha 2$, x2, y2, z2), wherein $\alpha 2$ is a time difference between a clock of UE2 and the satellites, and x2, y2 and z2 are three-dimensional coordinates of UE2 respectively;

UE3 may not receive the signals from any satellite, and does not meet the independent positioning condition, so that UE3 may not independently finish positioning; and according to a building map, UE3 is located in the same indoor horizontal plane with UE1 and UE2, so that an unknown position is presumed to be (x, y), wherein x and y are coordinates of UE3 in a plane formed by UE1 and UE2 respectively.

1: UE3 does not meet the independent positioning condition, namely does not have a positioning capability, so that UE3 is determined as assistant positioning request UE, the assistant positioning request UE sets signal strength of an assistant positioning request into the lowest level, and if received assistant positioning information is insufficient, the signal strength level of the assistant positioning request is increased.

2: UE3 initiates the assistant positioning request to UE around, and records sending time T0 of the assistant positioning request.

3: The UE around receives the assistant positioning request, records receiving time, i.e. time of arrival, of the assistant positioning request, simultaneously judges whether the UE around an assistant positioning condition or not, and is determined as assistant positioning response UE if the UE around meets the assistant positioning condition.

In the embodiment, UE1 and UE2 are UE around UE3. When the signal strength level of the assistant positioning request is regulated to a certain level, UE1 and UE2 may both be determined as the assistant positioning response UE.

4: UE1 records time of arrival of the assistant positioning request, i.e. receiving time T11 of the assistant positioning request. Time when assistant positioning information in response to the assistant positioning request is sent, i.e. sending time of the assistant positioning information, is presumed to be T21·UE1 calculates delta1=T21-T11, and then sends the assistant positioning information including delta1 and (x1, y1) to UE3.

Similarly, UE2 records time of arrival of the assistant positioning request, i.e. receiving time T12 of the assistant positioning request, and time when assistant positioning information in response to the assistant positioning request is sent, i.e. sending time of the assistant positioning information, is presumed to be T22, and UE2 calculates delta2=T22-T12, and then sends the assistant positioning information including delta2 and (x2, y2) to UE3.

5: UE3 receives the assistant positioning information, sent request by UE1, in response to the assistant positioning, records time of arrival of the assistant positioning information, i.e. receiving time T31 of the assistant positioning information, and calculates a distance d1=c*(T31-T0-delta1) between UE3 and UE1.

Similarly, UE3 receives the assistant positioning information, sent by UE2, in response to the assistant positioning request, records time of arrival of the assistant positioning information, i.e. receiving time T32 of the assistant positioning information, and calculates a distance d2=c*(T32-T0-delta2) between UE3 and UE2.

6: According to the building map, the three pieces of UE are located in the same indoor plane, so that UE3 may establish an equation set including two spherical equations by virtue of the distance d1 between UE1 and UE3, coordinates (x1, y1) of UE1, the distance d2 between UE3 and UE2 and the coordinates (x2, y2) of UE2. Coordinates (x, y) of UE3 may be obtained by solving the equation set.

Figure 7:
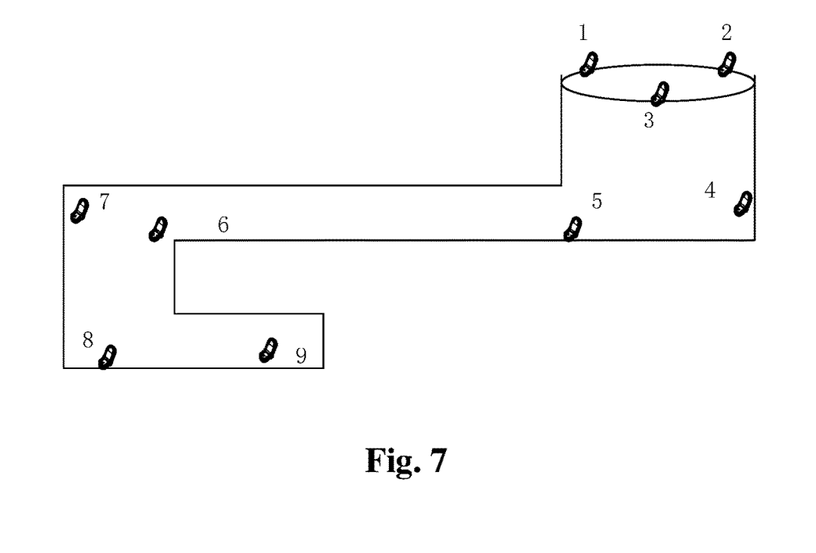
FIG. 7 is a scenario chart of assistant wireless UE positioning in a mine according to an embodiment of the present disclosure.

FIG. 7 is a scenario chart of assistant wireless UE positioning in a mine according to an embodiment of the present disclosure. As shown in FIG. 7, there are nine pieces of UE in the mine, and in the embodiment, since a spatial structure of the mine is known, the number of required cooperative UE, such as UE4, UE5, UE6, UE7, UE8 and UE9, may be reduced by virtue of the known mine structure.

UE1, UE2 and UE3 may independently finish positioning.

UE4 may obtain distances between UE4 and U1, UE2 and UE4 respectively under assistance of UE1, UE2 and UE3 which have finished positioning according to the assistant positioning method of the embodiment of the present disclosure.

Since UE1, UE2 and UE3 have finished positioning, spatial positions, i.e. spatial coordinates, of UE1, UE2 and UE3 are known.

If spatial coordinates of UE4 are unknown, an equation set including three equations may be established according to the three obtained distances and the known spatial coordinates of the three pieces of UE, and the equation set may be solved to obtain the spatial coordinates of UE4 to finish positioning of UE4.

Similarly, by an assistant positioning method similar to that for UE4, spatial coordinates of UE5 may be solved to finish positioning of UE5.

Under the condition that UE4 and UE5 have finished positioning, UE6 and UE7 may finish positioning under cooperation of UE4 and UE5, an equation set including two equations may be given according to distances from UE6 to UE4 and UE5, and the equation set is solved to obtain spatial coordinates of UE6 in the same horizontal plane with UE4 and UE5 to finish positioning of UE6. Similarly, an equation set including two equations may be listed according to distances from UE7 to UE4 and UE5, and the equation set is solved to obtain spatial coordinates of UE7 in the same horizontal plane with UE4 and UE5 to finish positioning of UE7.

Under the condition that UE6 and UE7 have finished positioning, UE8 may finish positioning under cooperation of UE6 and UE7. According to a spatial structure diagram of the mine, UE8 is located on the same plane with UE6 and UE7, so that an equation set including two equations may be given according to distances from UE8 to UE6 and UE7, and the equation set may be solved to obtain spatial coordinates of UE8 in the same vertical plane with UE6 and UE7 to finish positioning of UE8.

UE9 finishes positioning under assistance of UE8, and according to the spatial structure diagram of the mine, it may be determined that UE9 and UE8 are in the same linear passage, so that spatial coordinates of UE9 may be determined to finish positioning of UE9 by virtue of a distance equation.

From the above, the embodiment of the present disclosure has technical effects as follows:

1: in a crowded place with dense buildings, blind spots of a conventional positioning method such as satellite positioning may be remarkably eliminated;

2: in a large indoor space such as a shopping mall and an office building, blind spots of a conventional indoor positioning method may be remarkably eliminated;

3: in some special places such as a fire fighting passageway and a mine, temporary assistant UE may be placed in paths to implement positioning in these special places; and 4: in a temporary emergency place, a wireless positioning environment may be established.

The above is detailed description about the present disclosure and not intended to limit the present disclosure, and those skilled in the art may make various modifications according to the principle of the present disclosure. Therefore, all modifications made according to the principle of the present disclosure shall be understood to fall within the scope of protection of the present disclosure.

INDUSTRIAL APPLICABILITY

As mentioned above, the assistant wireless terminal positioning method and device provided by the embodiment of the present disclosure have beneficial effects as follows: in a crowded place with dense buildings, blind spots of a conventional positioning method such as satellite positioning may be remarkably eliminated; in a large indoor space such as a shopping mall and an office building, blind spots of a conventional indoor positioning method may be remarkably eliminated; in some special places such as a fire fighting passageway and a mine, temporary assistant UE may be placed in paths to implement positioning in these special places; and in a temporary emergency place, a wireless positioning environment may be established.

What is claimed is:

1. A wireless User Equipment (UE) positioning assistant method, comprising:

initiating, by first UE without a positioning capability, an assistant positioning request to at least one piece of second UE which has finished positioning nearby, and storing sending time of the assistant positioning request;

receiving, by the first UE, assistant positioning information, sent by the second UE, in response to the assistant positioning request, and storing receiving time of the assistant positioning information; and determining, by the first UE, a spatial position of the first UE by virtue of the received assistant positioning information, the receiving time of the assistant positioning information and the sending time of the assistant positioning request;

wherein before the first UE without the positioning capability initiates the assistant positioning request to the at least one piece of second UE which has finished positioning nearby, the method further comprises judging whether the first UE has the positioning capability or not, wherein judging whether the first UE has the positioning capability or not comprises: comparing, by the first UE, an amount of known positioning information of the first UE with a first preset threshold; and based on that the amount is smaller than the first preset threshold, determining that the first UE does not have the positioning capability, and based on that the amount is not smaller than the first preset threshold, determining that the first UE has the positioning capability; wherein a source of the known positioning information comprises a satellite and/or a wireless base station and/or a Wireless Fidelity (WIFI) node.

2. The method according to claim 1, wherein the second UE which has finished positioning receives the assistant positioning request and compares signal strength of the assistant positioning request with a second preset threshold, and based on that the signal strength is higher than the second preset threshold, the second UE sends the assistant positioning information in response to the assistant positioning request to the first UE.

3. The method according to claim 2, wherein the assistant positioning information comprises a spatial position of the second UE and a time difference between the sending time of the assistant positioning information and the receiving time of the assistant positioning request.

4. The method according to claim 3, wherein determining, by the first UE, the spatial position of the first UE by virtue of the assistant positioning information, the receiving time of the assistant positioning request and the sending time of the assistant positioning request comprises:

determining, by the first UE, a distance between the first UE and the second UE by virtue of the receiving time of the assistant positioning information, the sending time of the assistant positioning request and the time difference between the sending time of the assistant positioning information and the receiving time of the assistant positioning request; and determining the spatial position of the first UE by virtue of the distance and the spatial position of the second UE.

5. The method according to claim 4, wherein based on that a sum of the amounts of the known positioning information of the first UE and the received assistant positioning information is smaller than the first preset threshold, the signal strength of the assistant positioning request is increased to increase the amount of the assistant positioning information responsive to the assistant positioning request until the sum of the amounts is more than or equal to the first preset threshold so as to endow the first UE with the positioning capability.

6. The method according to claim 1, wherein based on that a sum of the amounts of the known positioning information of the first UE and the received assistant positioning information is smaller than the first preset threshold, the signal strength of the assistant positioning request is increased to increase the amount of the assistant positioning information responsive to the assistant positioning request until the sum of the amounts is more than or equal to the first preset threshold so as to endow the first UE with the positioning capability.

7. A User Equipment (UE) positioning assistant device, comprising:

a request sending component configured to, when first UE to which the request sending component belongs does not have a positioning capability, initiate an assistant positioning request to at least one piece of second UE which has finished positioning near the first UE, and store sending time of the assistant positioning request;

a response receiving component configured to receive assistant positioning information, sent by the second UE, in response to the assistant positioning request, and store receiving time of the assistant positioning information; and a positioning calculation component configured to determine a spatial position by virtue of the assistant positioning information, the receiving time of the assistant positioning information and the sending time of the assistant positioning request;

wherein the device further comprises a capability determination component configured to compare an amount of known positioning information of the first UE with a first preset threshold, determine that the first UE does not have the positioning capability based on that the amount is smaller than the first preset threshold, determine that the first UE has the positioning capability based on that the amount is not smaller than the first preset threshold, wherein a source of the known positioning information comprises a satellite and/or a wireless base station and/or a Wireless Fidelity (WIFI) node.

8. The device according to claim 7, wherein the assistant positioning information comprises a spatial position of the second UE and a time difference between the sending time of the assistant positioning information and the receiving time of the assistant positioning request, and the positioning calculation component comprises:

a distance determination sub-component configured to determine a distance between the first UE and the second UE by virtue of the receiving time of the assistant positioning information, the sending time of the assistant positioning request and the time difference between the sending time of the assistant positioning information and the receiving time of the assistant positioning request; and a position determination sub-component configured to determine the spatial position of the first UE by virtue of the distance and the spatial position of the second UE.

9. A wireless User Equipment (UE) positioning assistant device, comprising:

a request receiving component configured to receive an assistant positioning request from first UE without a positioning capability, the first UE configured to store a sending time of the assistant positioning request;

a comparison component configured to compare signal strength of the assistant positioning request with a second preset threshold of second UE to which the comparison component belongs; and a response sending component configured to, when the signal strength is higher than the second preset threshold, send assistant positioning information in response to the assistant positioning request to the first UE for the first UE to implement the requested assistant positioning, the first UE configured to store a receiving time of the assistant positioning information;

wherein the device further comprises a capability determination component configured to compare an amount of known positioning information of the first UE with a first preset threshold, wherein the first UE without the positioning capability is a UE of which the amount of known positioning information is smaller than the first preset threshold, wherein the first UE has the positioning capability based on that the amount is not smaller than the first preset threshold, wherein a source of the known positioning information comprises a satellite and/or a wireless base station and/or a Wireless Fidelity (WIFI) node.

* * * * *